United States Patent
De'Longhi et al.

(10) Patent No.: US 11,197,487 B2
(45) Date of Patent: Dec. 14, 2021

(54) DEVICE FOR HEATING AND EMULSIFYING BEVERAGES

(71) Applicant: De'Longhi Appliances S.R.L., Treviso (IT)

(72) Inventors: Giuseppe De'Longhi, Treviso (IT); Guido Quaratesi, Treviso (IT); Claudio Cristofoli, Treviso (IT); Giovanni Rossetto, Treviso (IT)

(73) Assignee: DeLonghi Appliances S.R.L., Treviso (IT)

( * ) Notice: Subject to any disclaimer, the term of this patent is extended or adjusted under 35 U.S.C. 154(b) by 450 days.

(21) Appl. No.: 16/255,918

(22) Filed: Jan. 24, 2019

(65) Prior Publication Data

US 2019/0223472 A1 Jul. 25, 2019

(30) Foreign Application Priority Data

Jan. 24, 2018 (IT) .................. 102018000001723

(51) Int. Cl.
| | |
|---|---|
| *A23L 2/54* | (2006.01) |
| *A47J 31/44* | (2006.01) |
| *A47J 31/46* | (2006.01) |
| *A47J 31/54* | (2006.01) |

(52) U.S. Cl.
CPC .............. *A23L 2/54* (2013.01); *A47J 31/441* (2013.01); *A47J 31/4489* (2013.01); *A47J 31/46* (2013.01); *A47J 31/461* (2018.08); *A47J 31/468* (2018.08); *A47J 31/542* (2013.01); *A23V 2002/00* (2013.01); *A23V 2250/101* (2013.01); *A23V 2300/24* (2013.01)

(58) Field of Classification Search
CPC ...... A47J 31/441; A47J 31/461; A47J 31/468; A47J 31/4489; A23V 2300/24; A23V 2002/00; A23V 2002/225; A23V 2002/101
USPC .................. 99/279, 280, 281, 284, 293, 294
See application file for complete search history.

(56) References Cited

U.S. PATENT DOCUMENTS

| | | | | |
|---|---|---|---|---|
| 2005/0279215 | A1* | 12/2005 | Cai | A47J 31/54 99/279 |
| 2009/0095163 | A1* | 4/2009 | Sala | A47J 31/469 99/284 |
| 2013/0112083 | A1* | 5/2013 | Douma | A47J 31/44 99/294 |
| 2013/0145936 | A1* | 6/2013 | Dollner | A47J 31/4489 99/293 |

* cited by examiner

*Primary Examiner* — Thien S Tran
(74) *Attorney, Agent, or Firm* — Blank Rome LLP

(57) ABSTRACT

Device for heating and emulsifying beverages includes a pump (2), an air and water meeting zone (10), a device for producing steam, and a first conduit (5) for steam mixed with air that communicates with a steam wand (6) adapted to be immersed into a beverage (7) to be heated and emulsified. The device for producing steam includes an instant steam generator (4). The meeting zone (10) is positioned before the instant steam generator (4).

12 Claims, 1 Drawing Sheet

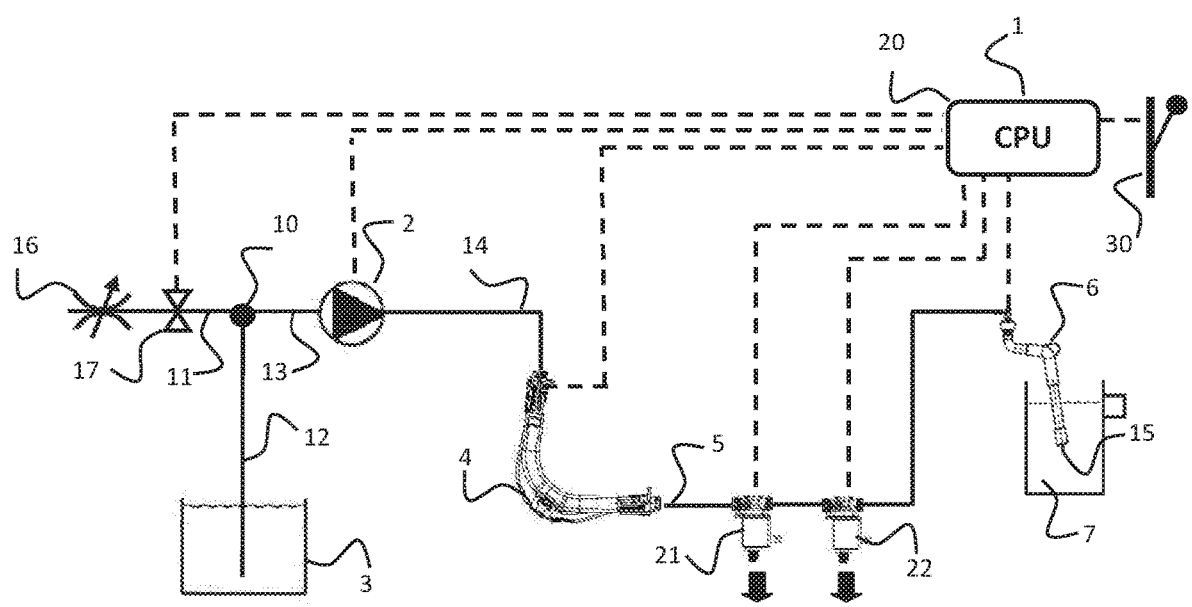

DEVICE FOR HEATING AND EMULSIFYING BEVERAGES

RELATED APPLICATIONS

This application claims priority to Italy Application No. 102018000001723, filed Jan. 24, 2018. The above-identified related application is incorporated by reference.

FIELD OF USE

The present invention refers to a device for heating and emulsifying beverages and in particular milk-based beverages.

BACKGROUND OF THE INVENTION

As known, currently, the devices for heating and emulsifying milk-based beverages comprise a device for producing steam that is defined by a steam boiler into which cold air under pressure is delivered coming from a source of compressed air and cold water coming from a pump are delivered.

Downstream of the boiler, there is a conduit for steam mixed with air communicating with a steam wand adapted to be immersed into the beverage to be heated and emulsified.

The devices disclosed above have the drawback of not ensuring correct mixing of the air and the steam because, as seen, the cold air is delivered directly inside the boiler, forming therein three distinct areas of hot water, air and steam.

This phenomenon occurs because the cold air injected inside the boiler, for example at a temperature of 25° C., has a higher specific volume than the steam inside the boiler (for example water vapour at 2.5 bar) and in turn different from the specific volume of the water.

The above entails stratification of steam in the upper part of the boiler and air and water in the lower part of the boiler because the specific volumes are different and no stirring motions are present.

At the moment in which the steam is drawn off from the boiler to heat and froth the milk, this stratification does not ensure correct homogenization of the steam/air mixture, which is drawn, which has a negative effect on the milk frothing quality.

This problem is aggravated further if the outlet channel from the boiler is positioned in the upper part of the boiler in the zone where the steam stratifies.

Further, using a steam storage boiler implies that the boiler must have the appropriate pressure and temperature resistance features even in the rest condition.

SUMMARY OF THE INVENTION

The task of the present invention is to make a device for heating and emulsifying beverages that eliminates the aforementioned technical drawbacks of the prior art.

As part of this task, one aim of the invention is to make a device for heating and emulsifying beverages that avoids using a pressurized receptacle that has to maintain high pressure and temperature for a long period.

A further aim of the invention is to make a device for heating and emulsifying beverages that enables water and/or air to be added at any moment inside the vaporizer, even if the device is operating, ensuring significant practicality and an undisputed time saving.

A further aim of the invention is to make a device for heating and emulsifying beverages that permits instant and continuous vaporization according to need.

Another aim of the invention is to make a device for heating and emulsifying beverages that ensures perfect mixing between the air and water before the mixture thereof is delivered inside the instant pressure generator.

A further aim of the invention is to make a device for heating and emulsifying beverages that permits perfect emulsification of the beverage.

This task, as well as these and other objects are achieved by a device for heating and emulsifying beverages comprising a pump, an air and water meeting zone, a device for producing steam and a first conduit for steam mixed with air communicating with a steam wand adapted to be immersed into the beverage to be heated and emulsified, characterized in that said device for producing steam comprises an instant steam generator and that said meeting zone is positioned before said instant steam generator.

Further features of the present invention are further defined in the claims appended to the main claim that define the structure of the device better.

BRIEF DESCRIPTION OF THE DRAWINGS

Further features and advantages of the invention will more fully emerge from the description of a preferred but not exclusive embodiment of the device for heating and emulsifying beverages according to the invention, illustrated by way of non-limiting example in the attached drawing, in which:

FIG. 1 is a view of the operating diagram of the device according to the invention.

DETAILED DESCRIPTION OF THE ILLUSTRATED EMBODIMENTS

With particular reference to the FIGURE disclosed above, the device for heating and emulsifying beverages is indicated overall by the number 1.

The device 1 comprises a pump 2 that sucks water from a water storage tank 3 of the pump so that the water is received by an air and water meeting zone 10 placed before the pump 2 and a device for producing steam defined, advantageously, by an instant steam generator 4.

In particular, the pump 2 is preferably a gear pump and draws the water from the tank 3 by a first water conduit 12 that communicates directly with said meeting zone 10.

The instant steam generator 4 is advantageously switched off but ready for use immediately and does not require long startup times.

A first conduit 5 for steam mixed with air communicating with a steam wand 6 adapted to be immersed in the preferably milk-based beverage 7 to be heated and emulsified is connected to the instant steam generator 4.

The meeting zone 10 communicates with an air conduit 11 on which there is a first valve system for blocking or modulating the flow of air associated with said air conduit and in particular a flow adjuster 16 and an on/off valve 17.

The flow adjuster 16 and the valve 17 could be possibly replaced by a single valve, which is not shown, which can be activated appropriately for blocking or modulating the flow of air inside the air conduit 11.

Advantageously, the device 1 comprises a second conduit 14 for water mixed with air that communicates on one side with the pump 2 and on the other side with the instant steam generator and a third conduit 13 for water mixed with air that communicates on one side with the meeting zone 10 and on the other side with the pump 2.

The second conduit 14 enters the interior of said instant steam generator 4 directly, supplying the latter with a homogeneous water/air mixture so as to ensure optimum vaporization thereof.

Advantageously, in this manner the water and air simultaneously entering the vaporizer are heated: the water is boiled and the air expands.

The turbulence caused by the boiling process and by the expansion of the air creates whirling motions that ensure correct mixing of the steam and air adapted to optimizing the frothing or emulsifying and heating process of the beverage The steam wand 6 comprises a thermal probe 15 for detecting the temperature of the beverage 7.

Management of the device 1 is entrusted to a control unit CPU 20 that is connected, as visible in FIG. 1 with a broken line, to the pump 2, the on/off valve 17, the instant steam generator 4, the probe 15 and at least one first valve 21 to lower pressure inside the instant steam generator 4 up to ambient pressure and ensure emptying of the generator 4 when in the rest condition.

The control unit 20 is further connected to at least one second valve 22 for restoring the ambient pressure between the first valve and the steam wand.

In one variant embodiment the valve 22 can be replaced by a non-return valve that is not shown.

In the light of what has been said, it is possible to diversify at will the operating sequences of the device 1.

For example, it is possible to vary the various operating sequences by simultaneously activating or deactivating the valve 17 on the pump 2 during the operating cycle of the device so as to be able to modulate at will the volume of the froth with respect to the desired heating of the beverage.

The device according to the invention operates as follows.

The user uses the dedicated selector 30 to switch on the device and the control unit 20 reads the signal of the temperature probe 15 that starts to record the temperature of the beverage.

Subsequently, the control unit 20 activates the pump 2 and the instant steam generator 4 together with the two discharge valves 21 and 22.

The steam starts to flow in the steam wand 6 and heat the beverage 7.

When a set temperature is reached (for example 30° C.) the control unit 20 activates the air valve 17.

The mixture of water and air is formed in the meeting zone 10 placed before the instant steam generator 4 and pump 2.

After the passage through the instant steam generator the mixture of air and water flows into the beverage, continuing heating and emulsification of the beverage.

When the desired temperature is reached, for example 65° C., the control unit deactivates the pump, the instant steam generator and the two valves.

Through the effect of the pressure delta between the inner and outer environment, the instant steam generator 4 is emptied.

The device for heating and emulsifying beverages as conceived herein is susceptible to many modifications and variations, all falling within the scope of the inventive concept; furthermore, all the details are replaceable by technically equivalent elements.

In practice the materials used, as well as the dimensions, can be any according to the needs and the state of the art.

The invention claimed is:

1. A device for heating and emulsifying beverages comprising a pump (2), a meeting zone (10) of air and water, a device for producing steam and a first conduit (5) for steam mixed with air communicating with a steam wand (6) adapted to be immersed in a beverage (7) to be heated and emulsified, wherein the device for producing steam comprises an instant steam generator (4), where the meeting zone (10) is positioned before said instant steam generator (4), and where said first conduit (5) for steam mixed with air comprises at least one first valve (21) for reducing pressure inside said instant steam generator (4) to ambient pressure and ensuring emptying of the instant steam generator (4) in a rest condition.

2. The device according to claim 1, wherein said meeting zone (10) is positioned before said pump (2), and said pump (2) is positioned before said instant steam generator (4).

3. The device according to claim 1, wherein said pump (2) draws water from a tank (3) through a water conduit (12) and draws air from an air conduit (11), the water conduit (12) and the air conduit (11) intersecting one another in said meeting zone (10).

4. The device according to claim 3, wherein said air conduit (11) comprises, before said meeting zone (10), a flow adjuster (16) and an opening and closing valve (17).

5. The device according to claim 1, further comprising a second conduit (14) for water mixed with air that communicates on one side with said pump (2) and on an other side with said instant steam generator (4).

6. The device according to claim 1, further comprising a third conduit (13) for water mixed with air that communicates on one side with said meeting zone (10) and on an other side with said pump (2).

7. The device according to claim 1, wherein said steam wand comprises a thermal probe (15) for detecting a temperature of said beverage.

8. The device according to claim 1, further comprising a control unit (20) connected to said pump (2), to a flow adjuster (16), to an opening and closing valve (17), to said instant steam generator (4), and to a thermal probe (15) of said steam wand (6).

9. The device according to claim 1, wherein said pump (2) internally mixes homogeneously cold air and cold water and sends said homogeneous mixture directly to said instant steam generator (4).

10. The device according to claim 1, wherein a second conduit (14), for water mixed with air that communicates on one side with said pump (2) and on an other side with said instant steam generator (4), enters directly inside said instant steam generator (4).

11. The device according to claim 1, further comprising a first valve system for blocking or modulating a flow of air associated with an air conduit (11).

12. The device according to claim 1, wherein said first conduit (5) for steam mixed with air further comprises at least one second valve (22) for restoring ambient pressure between said first valve (21) and said steam wand (6).

* * * * *